United States Patent [19]

Williams et al.

[11] 4,213,874

[45] Jul. 22, 1980

[54] SYNTHETIC AMORPHOUS SODIUM ALUMINOSILICATE BASE EXCHANGE MATERIALS

[75] Inventors: Lloyd E. Williams, Bel Air; Robert K. Mays, Havre de Grace, both of Md.

[73] Assignee: J. M. Huber Corporation, Rumson, N.J.

[21] Appl. No.: 872,968

[22] Filed: Jan. 27, 1978

Related U.S. Application Data

[60] Continuation of Ser. No. 622,585, Oct. 15, 1975, abandoned, which is a division of Ser. No. 522,375, Nov. 8, 1974, abandoned.

[51] Int. Cl.² .................. C01B 33/28; C02B 1/44; C11D 3/12; C11D 3/14
[52] U.S. Cl. .................. 252/174.25; 252/179; 423/329
[58] Field of Search .................. 423/328, 329; 252/89, 252/131, 140, 179, 174.25

[56] References Cited

U.S. PATENT DOCUMENTS

| | | | |
|---|---|---|---|
| 2,677,665 | 5/1954 | James | 252/131 |
| 3,206,408 | 9/1965 | Vitalis | 252/557 |
| 3,650,967 | 3/1972 | Johnson | 252/135 |
| 3,755,180 | 8/1973 | Austin | 252/99 |
| 3,868,336 | 2/1975 | Mazzola | 252/527 |
| 3,932,316 | 1/1976 | Sagel | 252/532 |
| 4,071,377 | 1/1978 | Schwuger | 134/29 |
| 4,083,793 | 4/1978 | Jakobi | 252/99 |

FOREIGN PATENT DOCUMENTS

| | | | |
|---|---|---|---|
| 813581 | 10/1974 | Belgium | 252/131 |
| 814581 | 11/1974 | Belgium | 252/131 |
| 2433485 | 2/1975 | Fed. Rep. of Germany | 252/131 |
| 1572147 | 5/1969 | France | |
| 26-1119 | 3/1951 | Japan | 252/131 |
| 1333810 | 10/1973 | United Kingdom | 252/99 |

OTHER PUBLICATIONS

Kurnakov, L. G. et al., "Permutite and its Properties", Akademiia Nauk SSSR, Seriia Khimicheskaia, 1937, (otdelenie matematicheskikh i estestvennykh), pp. 1381–1394.

*Primary Examiner*—Dennis L. Albrecht
*Attorney, Agent, or Firm*—Robert L. Price; Harold H. Flanders

[57] ABSTRACT

A method for producing certain novel finely divided amorphous, precipitated alkali metal alumino silicates having a increased ion exchange properties is disclosed. The products of the invention are produced by commingling and precipitating, under certain controlled conditions, dilute aqueous solutions of an alkali metal silicate and alkali metal aluminate. Significant process variables include the chemical composition and concentration of the reactants, the precipitating temperatures and pH, the sequence and rate of the addition of the reactants and the mixing intensity during the precipitation. The amorphous products of the invention have base or ion exchange capacities equal and/or superior to known crystalline zeolitic base exchangers or absorbents and such may be used for water softening. Their use in detergents is also disclosed.

1 Claim, 6 Drawing Figures

SYNTHETIC AMORPHOUS SODIUM ALUMINOSILICATE BASE EXCHANGE MATERIALS

This is a continuation of application Ser. No. 622,585, filed Oct. 15, 1975 and now abandoned which is a divisional of Ser. No. 522,375, filed Nov. 8, 1974 and now abandoned.

BACKGROUND OF THE INVENTION

1. Field of the Invention

The present invention relates to the synthetic amorphous precipitated alumino silicates and more particularly to the production of amorphous sodium alumino silicates having increased ion or base exchange properties.

2. The Prior Art

Cation exchangeable materials and their use, for example, in water softenings, are well known in the art. While many products are known to posses such properties, in general, a particularly suitable class of ion exchangers are the so-called zeolites, which occur naturally in nature or may be produced synthetically. Crystalline alumino silicate zeolites structurally consist basically of an open three-dimensional framework of $SiO_4$ and $AlO_4$ hedrahidra. Specific examples of synthetic zeolites, methods for their production as well as their use as ion exchangers, adsorbents and the like are disclosed in U.S. Pat. Nos. 2,882,243; 3,008,803; 2,962,355; 2,996,358; 3,010,789; 3,012,853; and 3,130,007. Other known base exchange materials are base exchange gels which are granular products made by the reaction of sodium silicate and aluminum compounds. These products have to some extent been used for large-scale water softening and remove calcium and magnesium from water and may be regenerated by passing a solution of NaCl through a filter bed of the hard granules. In this regard see U.S. Pat. Nos. 1,586,764; 1,717,777; 1,848,127; and British Pat. No. 177,746.

In recent years a number of synthetic amorphous, precipitated sodium alumino-silicate pigments, manufactured and sold under the trademark "Zeolex", have been prepared. Examples of these products, and methods for their preparation, are disclosed in U.S. Pat. Nos. 2,739,073 and 2,848,346. Such pigments have been found to be useful in a wide range of applications such as fillers and reinforcing pigments for rubber compounds, plastics, paper and paper coating compositions, paints, adhesives, etc. While such amorphous sodium alumino-silicate pigments have been found to be useful in such applications, their use as a base or ion exchange product has heretofore been considered impractical because of their low exchange capabilities.

SUMMARY OF THE INVENTION

In summary, the present invention relates to the production of synthetic amorphous sodium alumino-silicates which have increased ion or base exchange properties or characteristics. As briefly noted above, while known amorphous alumino-silicate ion pigments, (as disclosed in U.S. Pat. No. 2,739,073) are known to posses ion exchange capabilities, the products of the invention are superior to the extent that they have an increase of from about 2 to 5 times ion exchange capacity over known amorphous pigments and are equal or superior to known crystalline materials, such as the above-discussed zeolites.

In its broadest aspect, the amorphous high ion exchange products of the invention are produced by commingling and precipitating, under certain controlled conditions, dilute aqueous solutions of an alkali metal silicate, such as sodium silicate, and an alkali metal aluminate, such as sodium aluminate. As used herein, the term alkali metal refers to Group Ia metals which include sodium potassium, lithium, cesium, and rubidium. For convenience, reference will hereinafter be made to sodium.

The process of the invention involves carefully controlled precipitation conditions and as such, is in direct contrast to known crystallization, digestion, and/or gellation techniques. Critical precipitation conditions include the chemical composition and concentration of the reactants, the precipitating temperature and pH, the sequence and rate of the addition of the reactants and the mixing intensity during the precipitation. As to the composition of the reactants, the alkali metal silicate should have a $SiO_2/M_2O$ mol ratio of from 1 to 4 wherein M is an alkali metal. The composition and concentration of the aluminate, as will be discussed in more detail hereinafter, must be controlled to maintain maximum solubility and stability. The precipitating temperature is on the order of between from about 25° to 70° C. and preferably 40° to 60° C. The pH of the precipitating mass must be maintained above about 10.5. In the practice of the invention, the sequence of the addition of the reactants is critical to the extent that the reactants may not be simply admixed, as in known crystallization, digestion and gellation processes, but they must commingled in a manner such that the proportions of the individual reactive ionic species in the reaction area or zone has a predetermined concentration range.

As indicated, the products of the invention have high and increased ion exchange capacities. As such they are particularly suitable for use in water softening and in detergents. In this regard, additional benefits of the new products of the invention include more bulking (lighter product), conditioning of finished product by anti-caking, less deposition or entrapment of these products in fabrics, higher absorptivity for non-ionic surfactants and better suspension in carrying-off waters (less settling).

It is accordingly a general object of the invention to provide a novel amorphous sodium alumino silicate pigment having increased ion or base exchange properties and A further object is to provide a method for precipitating high ion exchange amorphous alumino-silicates by the reaction of alkali metal silicates and alkali metal aluminates, under certain controlled process conditions.

Yet another object is to provide an amorphous sodium alumino silicate pigment for use in water softening and which has further particular utility for use in detergents.

BRIEF DESCRIPTION OF THE DRAWINGS

The manner in which the above and further objects of the invention are achieved will be better understood in view of the following detailed description and drawings, which form a part of this specification and, wherein.

DESCRIPTION OF PREFERRED EMBODIMENT(S)

Figure 1:
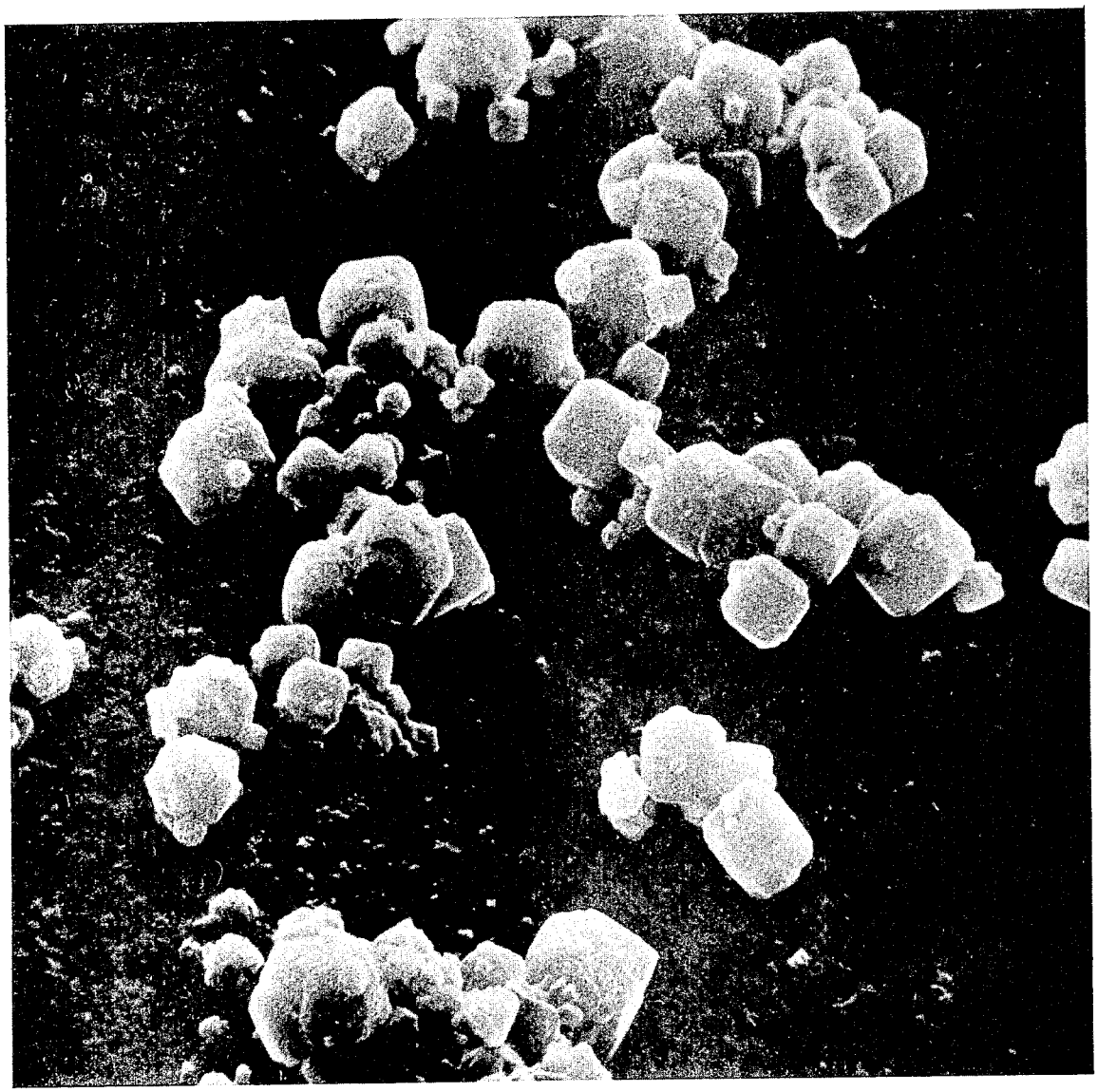
FIGS. 1, 2, and 5 are microphotographs of known crystalline zeolitic alumino silicate exchangers produced in accordance with the teachings of U.S. Pat. No. 2,882,243.
Figure 2:
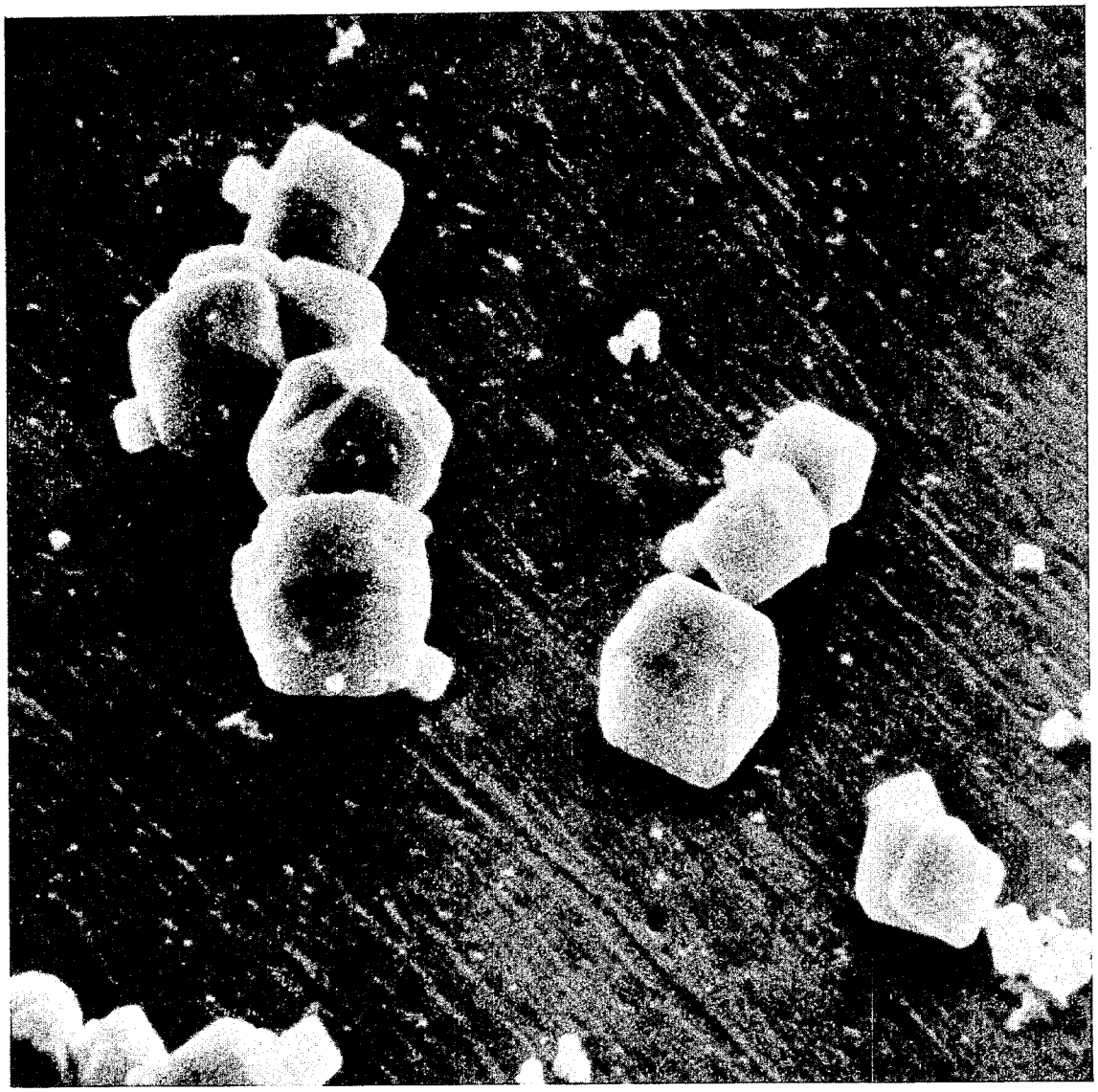
Figure 3:
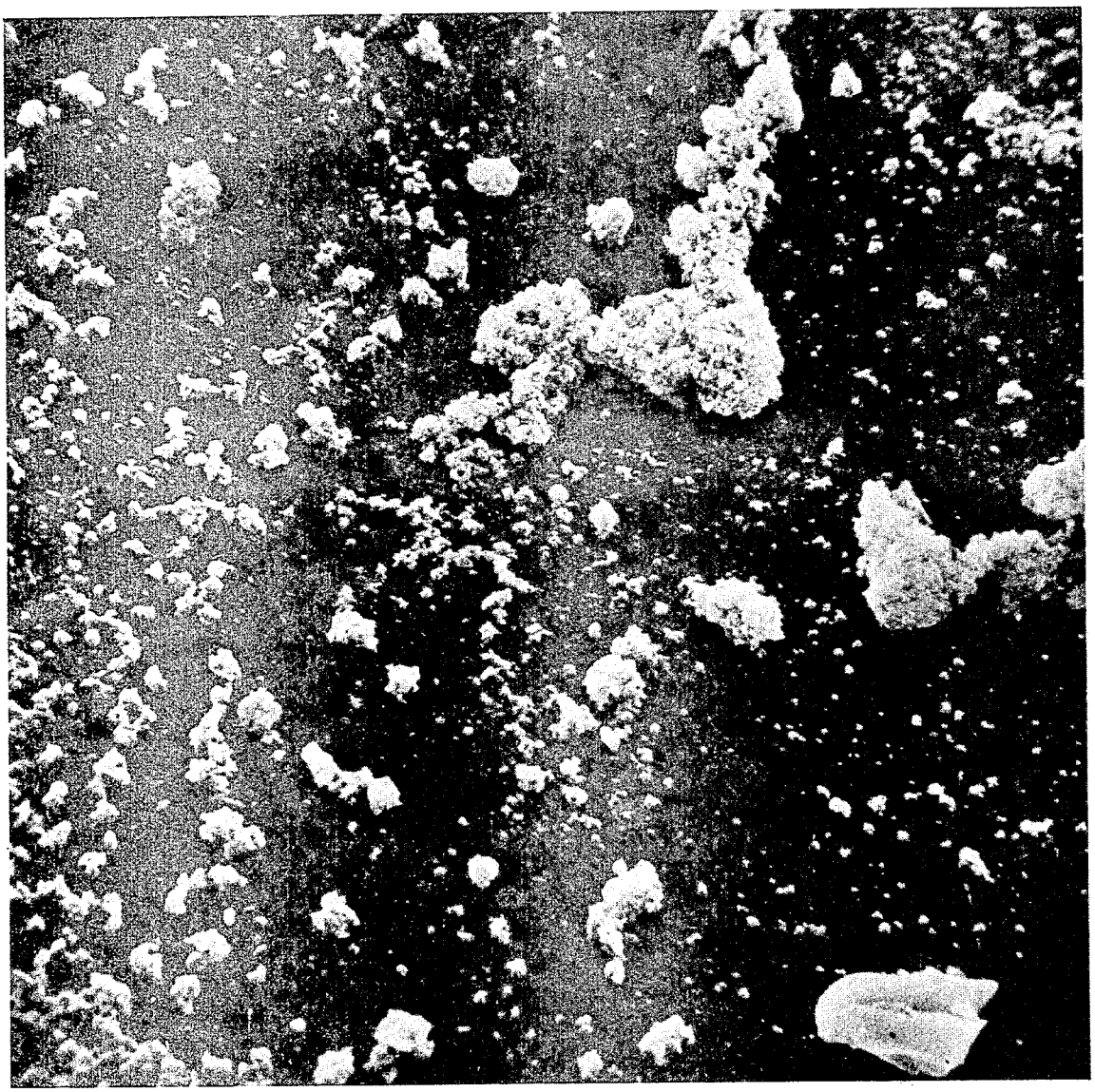
FIGS. 3, 4, and 6 are microphotographs of the amorphous precipitated sodium alumino silicates produced in accordance with the practice of the present invention.
Figure 4:
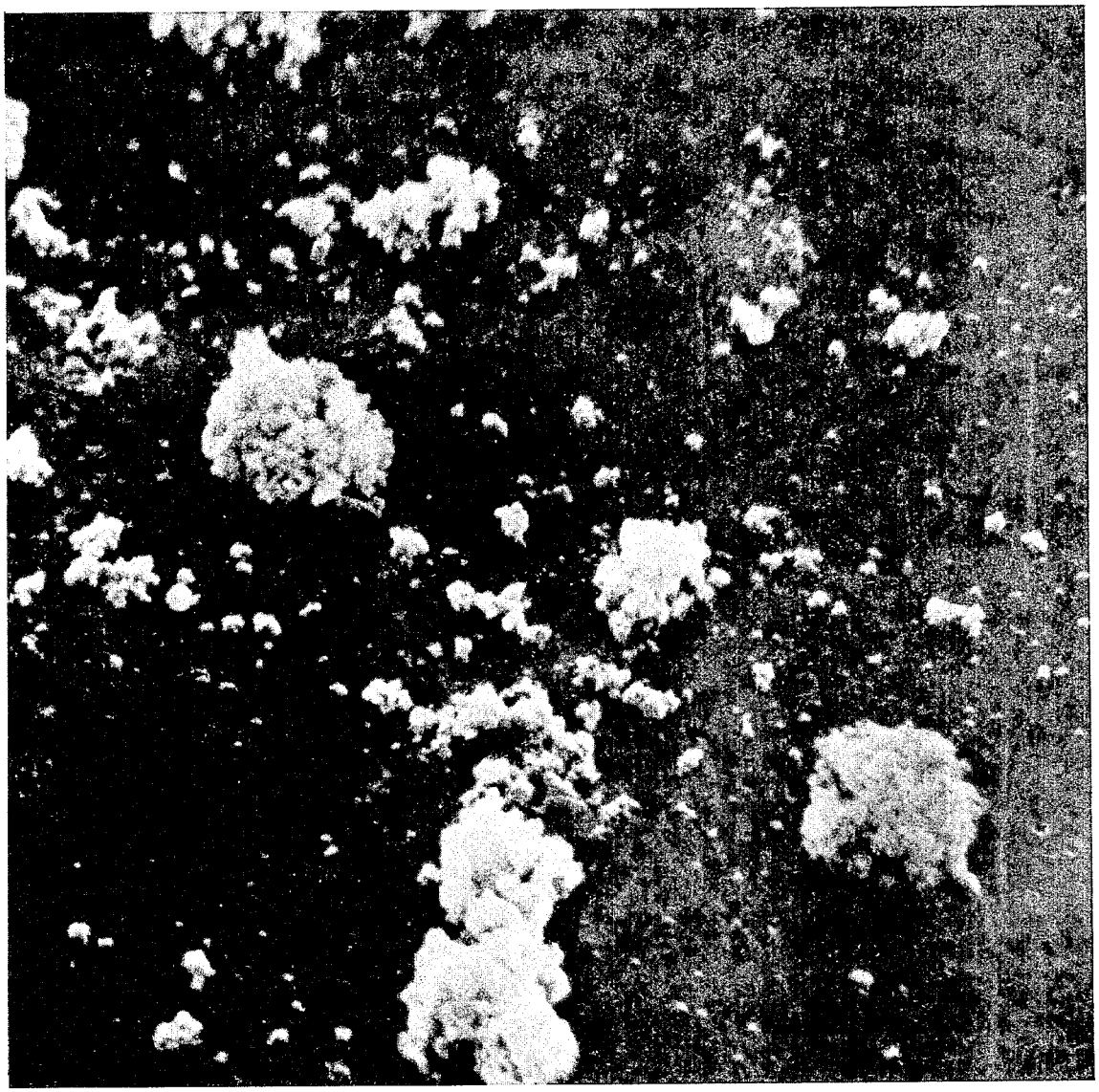
Figure 5:
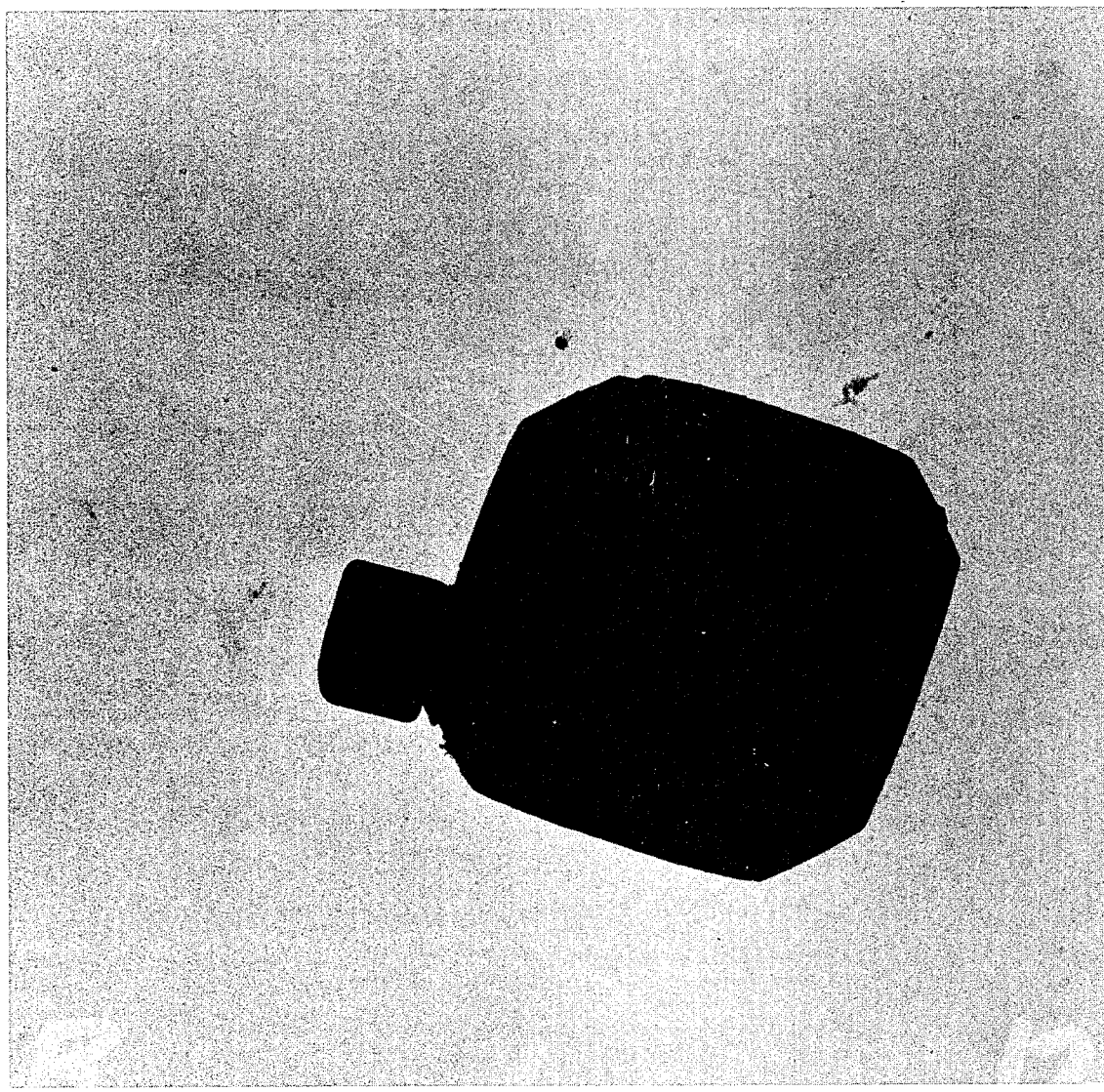
Figure 6:
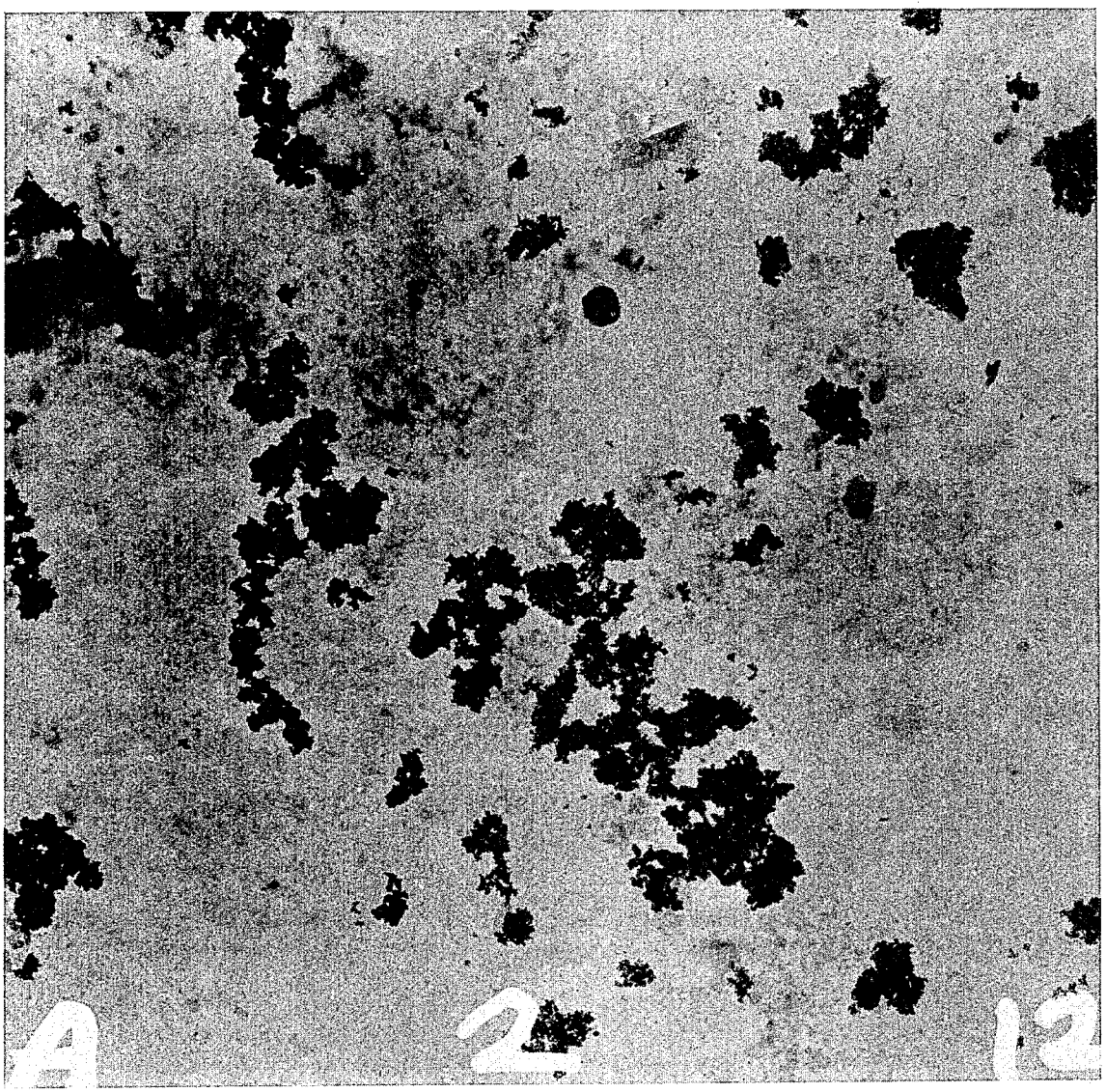

As discussed above, the present invention relates to the production of amorphous sodium alumino silicate pigments having increased base or ion exchange characteristics. In the practice of the invention, the high ion exchange amorphous product is produced by preparing an aqueous solution of an alkali metal silicate and first introducing this solution into a reactor or vessel provided with agitation means. Heating means such as a steam jacket is also provided. The silicate should be just that it has a $SiO_2/X_2O$ mol ratio of from 1 to 4, wherein X is an alkali metal. The alkali silicate solution so used should be of about 4 molar or lower concentration. Thereafter a dilute solution of an alkali metal aluminate, such as sodium aluminate (if sodium silicate is employed) is introduced slowly into the silicate solution. Prior to the introduction, the silicate solution is heated to a temperature of between from about 25° to 70° C. This temperature is maintained during the precipitation. The concentration of the aluminate solution should be 2 molar or lower and preferably about 1 molar. The aluminate should have a $X_2O/Al_2O_3$ mol ratio (wherein X is alkali metal) of from about 1 to 6. In a preferred embodiment NaOH may be premixed with the aluminate solution. In any event, the pH of the reaction mass must be maintained above about 10.5 during the precipitation and preferably on the order of from about 11 to 11.5. A high mixing intensity must be maintained throughout the reaction period with this being particularly significant during the addition of the dilute aluminate solution.

Upon completion of the reaction procedure the precipitated pigment is usually separated from the reaction liquid by filtration, but other means of separation such as centrifuging can be used as well. It generally is desirable to wash the freshly separated pigment with water to remove water soluble salts and the like, after which it may be dried in any suitable manner to obtain a friable mass which easily disintegrates into a fine powder.

As discussed, water-soluble sodium silicates and potassium silicates can be used according to this invention, but the much less expensive sodium silicates naturally are preferred. They are effective in compositions in which the ratio of $SiO_2$ to alkali metal oxide is from 1 to about 4, including the common alkali silicates ranging from the meta silicate $Na_2O.SiO_2$ to water glass with a composition of about $Na_2O.3.3SiO_2$. The use of a silicate having a $SiO_2/Na_2O$ mol ratio of from 2.2 to 2.8 is preferred. The aluminates employed are commercially available and well known in the art being disclosed, for example, in U.S. Pat. No. 2,882,243.

The products of the invention can be characterized by having a typical chemical composition of $Na_2O.Al_2O_3.2.0-3.8SiO_2$ X $H_2O$ where X can have values of 3 to 6. The primary particles of the newly discovered amorphous product are spherical and generally in the 400-500 A range. The primary particles accrete into stable aggregates of irregular shapes and sizes. The aggregates can be described as similar in shape to "grape clusters" and the sizes range from 2000-5000 A. The aggregates tend to form loosely structured agglomerates which can easily be disrupted by mechanical forces.

As previously noted, the process for generating these products can be described as carefully controlled precipitations, as contrasted with the crystallization or digestion process that is associated with the preparation of crystalline products.

Distinguishing differences in the physical properites of the various products are shown in Table I and performance similarities are readily apparent in the data shown in Table II.

The utility of these products as water softening agents where their base exchange properties are evident can be evaluated by well known methods for calcium exchange capacity and exchange rates. For commercial application, the products should be able to exchange at least 255 mg. $CaCO_3$/g under the conditions of the test and should be able to deplete a 4.7 gr./gal. (calcium hardness) hard water to 1.5 gr./gal. in 1 minute and 0.3 gr./gal. in 10 minutes. In this latter test, the base exchanger is added at a 0.06% level to mixed Ca-Mg hard water with 7.0 gr./gal. hardness. The results in Table II show that the amorphous and semi-crystalline products compare favorably with the crystalline product in performance.

The products of the invention are finely divided amorphous alkali metal aluminosilicate pigments having a substantially increased ion exchange capacity and being finely divided amorphous alkali metal aluminosilicates having an ion exchange capacity equal to crystalline zeolite and having an oil absorption of at least 75 cc. per 100 gram; a BET surface area of at least 50 $m^2g$; a pack density greater than 10 lbs./cu.ft.; a mercury intrusion void greater than 2.0 cc/gram; and a base exchange capacity of at least 200 mg/$CaCO_3$ per gram, and an initial water softening rate of 2.7 grains per gallon per minute.

Additional benefits of these products are projected for more bulking (lighter product), conditioning of finished product by anti-caking, less deposition or entrapment of these products in fabrics, higher absorptivity for non-ionic surfactants and better suspension in carry-off waters (less settling).

TABLE I

| PHYSICAL PROPERTIES | | | |
|---|---|---|---|
| | Zeolite A (U.S. 2,882,423) | Product of Example 1 | Product of Example 2 |
| % XRD (Form A) | 100 | Amorphous | Amorphous |
| BET Surface Area, $m^2/g$ | 3 | 96 | 90 |
| Oil Absorption cc/100 g | 25 | 149 | 145 |
| Pour Density, lb/$ft^3$ | 19.5 | 9.2 | 9.0 |
| Pack Density, lb/$ft^3$ | 34.7 | 18.4 | 17.8 |
| Mercury Intrusion, cc/g | 1.03 | 2.83 | 2.89 |
| 1% pH | 11.0 | 10.6 | 10.7 |
| % Alkalinity (% $Na_2O$) | 1.2 | 0.2 | 0.2 |
| MSA Particle Size % By Weight Less Than Size ($\mu$) | | | |
| 10% | 3.5 | 1.4 | 1.3 |
| 20% | 5.0 | 2.6 | 2.4 |
| 30% | 6.4 | 3.5 | 3.4 |
| 40% | 7.3 | 5.3 | 4.7 |
| 50% | 7.9 | 6.4 | 6.0 |
| 60% | 8.4 | 8.0 | 7.3 |
| 70% | 9.0 | 9.8 | 9.0 |
| 80% | 10.4 | 12.0 | 11.0 |
| 90% | 22.0 | 15.5 | 13.5 |

TABLE I-continued

| CHEMICAL COMPOSITION | | | |
|---|---|---|---|
| | Zeolite A (U.S. 2,882,423) | Product of Example 1 | Product of Example 2 |
| % H$_2$O | 20.9 | 19.2 | 19.1 |
| % Na$_2$O | 17.7 | 14.2 | 14.5 |
| % Al$_2$O$_3$ | 26.7 | 25.4 | 26.4 |
| % SiO$_2$ | 35.8 | 40.9 | 39.5 |
| TOTAL | 101.1 | 99.7 | 99.5 |
| SiO$_2$/Al$_2$O$_3$ | 2.28 | 2.74 | 2.54 |

TABLE II

| PERFORMANCE PROPERTIES | | | |
|---|---|---|---|
| | Min. Spec. | Zeolite A | Product of Example 1 | Product of Example 2 |
| Ca Exchange Capacity (mg. CaCO$_3$/g) | 255 | 261 | 282 | 280 |
| Ca Depletion Rate (gr./gal.) | | | | |
| 1 Minute | <1.5 | 0.41 | 0.73 | 0.90 |
| 10 Minutes | <0.3 | 0.1 | 0.22 | 0.20 |

As briefly noted above, the unique high ion exchange amorphous silicates of the invention have particular utility for for use in detergent compositions. In this regard, the silicates of the invention may be used with any of the conventional detergent classes, i.e., synthetic non-soap anionic, nonionic and/or amphoteric surface active compounds which are suitable as cleansing agents. Anionic surface active compounds can be broadly described as compounds which contain hydrophilic or lyophilic groups in their molecular structure and which ionize in an aqueous medium to give anions containing the lyophilic group. These compounds include the sulfated or sulfonated alkyl, aryl and alkyl aryl hydrocarbons and alkali metal salts thereof, for example, sodium salts of long chain alkyl sulfates, sodium salts of alkyl naphthalene sulfonic acids, sodium salts of sulfonated abietenes, sodium salts of alkyl benzene sulfonic acids particularly those in which the alkyl group contains from 8-24 carbon atoms; sodium salts of sulfonated mineral oils and sodium salts of sulfosuccinic acid esters such as sodium dioctyl sulfosuccinate.

Advantageous anionic surfactants include the higher alkyl aryl sulfonic acids and their alkali metal and alkaline earth metal salts such as for example sodium dodecyl benzene sulfonate, sodium tridecyl sulfonate, magnesium dodecyl benzene sulfonate, potassium tetradecyl benzene sulfonate, ammonium dodecyl toluene sulfonate, lithium pentadecyl benzene sulfonate, sodium dioctyl benzene sulfonate, disodium dodecyl benzene disulfonate, disodium diisopropyl naphthalene disulfonate and the like as well as the alkali metal salts of fatty alcohol esters of sulfuric and sulfonic acids, the alkali metal salts of alkyl aryl (sulfothioic acid) ethers and the alkyl thiosulfuric acid, etc.

Nonionic surface active compunds can be broadly described as compounds which do not ionize but usually acquire hydrophilic characteristics from an oxygenated side chain, such as polyoxyethylene, while the lyophilic part of the molecule may come from fatty acids, phenols, alcohols, amides or amines. Examples of nonionic surfactants include products formed by condensing one or more alkylene oxides of 2 to 4 carbon atoms, such as ethylene oxide or propylene oxide, preferably ethylene oxide alone or with other alkylene oxides, with a relatively hydrophobic compound such as a fatty alcohol, fatty acid, sterol, a fatty glyceride, a fatty amine, an aryl amine, a fatty mercaptan, tall oil, etc. Nonionic surface active agents also include those products produced by condensing one or more relatively lower alkyl alcohol amines (such as methanolamine, ethanolamine, propanolamine, etc.) with a fatty acid such as lauric acid, cetyl acid, tall oil fatty acid, abietic acid, etc. to produce the corresponding amide.

Particularly advantageous nonionic surface active agents are condensation products of a hydrophobic compound having at least 1 active hydrogen atom and a lower alkylene oxide (for example the condensation product of an aliphatic alcohol containing from about 8 to about 18 carbon atoms) and from about 3 to about 30 mols of ethylene oxide per mol of the alcohol, or the condensation product of an alkyl phenol containing from about 8 to about 18 carbon atoms in the alkyl group and from about 3 to about 30 mols of ethylene oxide per mol of alkyl phenol. Other nonionic detergents include condensation products of ethylene oxide with a hydrophobic compound formed by condensing propylene oxide with propylene glycol.

Amphoteric surface active compounds can be broadly described as compounds which have both anionic and cationic groups in the same molecule. Such compounds may be grouped into classes corresponding to the nature of the anionic-forming group, which is usually carboxy, sulfo and sulfato. Examples of such compounds include sodium N-coco beta amino propionate, sodium N-tallow beta amino dipropionate, sodium N-lauryl beta iminodipropionate and the like.

Other typical examples of these categories of the anionic, nonionic and/or amphoteric surface active agents are described in Schwartz and Perry "Surface Active Agents," Interscience Publishers, New York (1949) and the Journal of Americal Oil Chemists Society, voluem 34, No. 4, pages 170–216 (April 1957) which are incorporated herein by reference.

The amount of the exchange silicates necessary to be used with the surface active compound (active) may vary depending upon the end use, type of active employed, pH conditions and the like. The optimum active/exchanger ratio depends upon the particular active employed and the end use for which the detergent composition is intended but most generally will fall within the range of active/silicate exchange weight ratio of about 25:1 to 25:5.

The following examples will serve to further illustrate the invention but are not intended to limit it thereto.

EXAMPLE I

A 650-gallon kettle was provided with a propeller type agitator having a blade 10 inches in diameter rotatable at 900 R.P.M. A dilute alkali silicate solution was prepared by dissolving 285 lbs. of sodium silicate (Na$_2$O.2.5SiO$_2$) in 136 gals. of water, and a dilute solution of sodium aluminate (Na$_2$O/4Al$_2$O$_3$) was prepared by dissolving 187 lbs. thereof in 169 gals. of water. The kettle was charged with the silicate solution, and the agitator was started. As this same time the aluminate solution was introduced, in a thin stream, so as to strike the surface of the vigorously agitated liquid near the wall of the kettle. Addition continued for about 15 minutes, during which the rates of inflow were regulated so that the pH of the material stayed about 11. The addition of the sodium aluminate solution was continued. A total of 168 gals. of the solution was used. The temperature during the reaction was 26°–32° C. Agitation of the reaction material was continued for an additional 15 minutes, and then the precipitate was separated by the filtration and thoroughly washed with water. The resulting filter cake was dried at 110° C. to obtain a friable cake which disintegrated readily into a powder when squeezed. This cake was passed once through a screen mill with the screen removed, in order to convert the agglomerated mass completely into a fine powder. The yield was 623 lbs. The properties of the product are shown in Tables 1 and 2.

EXAMPLE II

This example was performed by use of the same equipment as described in Example 1. The kettle was charged with 88 gallons of water at room temperature. A silicate solution was prepared by dissolving 272 lbs. of a sodium silicate having the composition $Na_2O.1.9SiO_2$ om 187 gallons of water and an aluminate solution was prepared by dissolving 157 lbs. of sodium aluminate ($Na_2O.5Al_2O_3$) in 103 gallons of water. The precipitate then present was filtered off, dried, and pulverized as described in Example 1. Properites of this product are shown in tables 1 and 2.

EXAMPLE III

The general procedures of Examples 1 and 2 were repeated except that silicate and aluminate having $SiO_2/Na_2O$ mol ratios of from 1 to 4 and $Na_2O/Al_2O$ mol ratios of from 1 to 6, respectively, were substituted for the materials employed in Examples 1 and 2. By varying the oxide mol ratios it was found that products having an oil absorption of at least 75 cc/100 gm and BET surface areas of at 50 m²/g could be produced. Mercury intrusion vaoids were higher than 2.0 cc/gm. The base exchange capacities were at least 200 mg $CaCO_2/gm$. Water softening rates were on the order of about 3.5 grains per gallon per minute.

What is claimed is:

1. A washing composition comprising a synthetic detergent surfactant including as an ion exchange and water softening agent, a synthetic finely divided amorphous sodium aluminosilicate, said sodium aluminosilicate having the chemical composition $$Na_2O.Al_2O_3.2.0-3.8SiO_2.XH_2O$$

wherein X has a value of 3 to 6, the primary particles of said aluminosilicate being spherical and in the 400–500 A range, said particles accreting into stable aggregates of irregular shapes and sizes ranging from 2000–5000 A, said aluminosilicate having an oil absorption of at least 75 cc/100 gms, a pack density of greater than 10 pounds per cubic foot, a pour density in the range of 9.0 to 9.2 lb/ft³, a mercury intrusion void of greater than 2.0 cc/gm, a base exchange capacity of at least 255 mg $CaCO_3/gm$, and a water softening rate of at least 3.2 grains per gallon per minute; said softening agent being added at a 0.06% level to mixed Ca-Mg hard water with 7.0 gr./gal hardness; said sodium aluminosilicate ion exchange and water softening agent being present in said composition in sufficient amounts to provide a weight ratio of detergent surfactant to aluminosilicate of about 25:1 to 25:5, respectively; said amorphous sodium aluminosilicate being produced by the steps of: preparing an aqueous solution of 4 molar or lower sodium silicate, said silicate having a $SiO_2/Na_2O$ mole ratio of from about 2.2 to 2.8, subjecting said solution to vigorous agitation and adding to said silicate solution a dilute solution of sodium aluminate, said sodium aluminate having a $Na_2O/Al_2O_3$ mole ratio of from 1.0 to 6.0; continuing the vigorous agitation of the reaction mass formed by the addition of said sodium aluminate to said sodium silicate solution at a precipitating temperature of about 25°–70° C.; and maintaining the pH of said reaction mass at a level of at least 10.5 to thereby precipitate the finely divided amorphous sodium aluminosilicate.

* * * * *

UNITED STATES PATENT AND TRADEMARK OFFICE
CERTIFICATE OF CORRECTION

PATENT NO. : 4,213,874
DATED : July 22, 1980
INVENTOR(S) : Lloyd E. Williams and Robert K. Mays It is certified that error appears in the above—identified patent and that said Letters Patent is hereby corrected as shown below:

In Abstract, third line, the word "a" should be omitted.

Column 1, line 21, "posses" should be -- possess --.
line 27, "hedrahidra" should be -- tetrahedra --.
lines 62-63, "posses" should be -- possess --.

Column 2, line 33, following "must" the word -- be -- should be inserted.

Column 3, line 51, "meta" should be -- metal --.

Column 4, line 31, "m$^2$g" should be -- m$^2$/g --.
between lines 60-65, the "40% MSA Particle Size" for "Product of Example I" should be -- 5.0 -- rather than "5.3".

Column 5, line 26, "for for" should be -- for --.

Column 6, line 38, "voluem" should be -- volume --.

Column 7, line 20 "om" should be -- in --.
line 37, "vaoids" should be -- voids --.

Signed and Sealed this

Eighth Day of December 1981

[SEAL]

*Attest:*

*Attesting Officer*

GERALD J. MOSSINGHOFF

*Commissioner of Patents and Trademarks*